(12) United States Patent
Lee et al.

(10) Patent No.: US 8,835,063 B2
(45) Date of Patent: Sep. 16, 2014

(54) EVAPORATIVE HUMIDIFIER FOR FUEL CELL SYSTEM

(75) Inventors: Dae-Young Lee, Seoul (KR); Hoe-Woong Kim, Seoul (KR); Seo-Young Kim, Seoul (KR); Yoon-Pyo Lee, Seoul (KR)

(73) Assignee: Korea Institute of Science and Technology (KR)

( * ) Notice: Subject to any disclaimer, the term of this patent is extended or adjusted under 35 U.S.C. 154(b) by 1968 days.

(21) Appl. No.: 11/612,984

(22) Filed: Dec. 19, 2006

(65) Prior Publication Data

US 2007/0144454 A1    Jun. 28, 2007

(30) Foreign Application Priority Data

Dec. 23, 2005  (KR) .................. 10-2005-0129087

(51) Int. Cl.
*H01M 8/04*    (2006.01)
*H01M 8/06*    (2006.01)

(52) U.S. Cl.
CPC ............ *H01M 8/04141* (2013.01); *Y02E 60/50* (2013.01)
USPC ........... 429/414; 429/413; 429/434; 429/436; 429/437; 429/439; 429/440

(58) Field of Classification Search
USPC .......................... 429/26, 413, 414, 433-440
See application file for complete search history.

(56) References Cited

U.S. PATENT DOCUMENTS

| | | | |
|---|---|---|---|
| 6,568,465 B1 * | 5/2003 | Meissner et al. ............... | 165/133 |
| 6,779,351 B2 | 8/2004 | Maisotsenko et al. | |
| 6,871,844 B2 | 3/2005 | Yan et al. | |
| 2002/0086194 A1 * | 7/2002 | Blaszczyk et al. ............... | 429/26 |
| 2003/0189416 A1 * | 10/2003 | Scholta et al. ................ | 320/101 |
| 2003/0211374 A1 * | 11/2003 | Dehne ............................. | 429/26 |
| 2005/0112430 A1 * | 5/2005 | Nuttall et al. ................... | 429/26 |

* cited by examiner

*Primary Examiner* — Muhammad Siddiquee
(74) *Attorney, Agent, or Firm* — Ostrolenk Faber LLP

(57) ABSTRACT

An evaporative humidifier for a polymer electrolyte membrane fuel cell system including a fuel cell stack, comprising: a condensation channel to which exhaust gas from the fuel cell stack is introduced; an evaporation channel to which supply gas for the fuel cell stack is introduced; a partition wall for separating the condensation channel and the evaporation channel from each other; and a water distribution unit for supplying water into the evaporation channel, wherein the water is condensed in the condensation channel by heat exchange between the exhaust gas and the supply gas.

9 Claims, 9 Drawing Sheets

EVAPORATIVE HUMIDIFIER FOR FUEL CELL SYSTEM

RELATED APPLICATION

The present disclosure relates to subject matter contained in priority Korean Application No. 10-2005-0129087, filed on Dec. 23, 2005, which is herein expressly incorporated by reference in its entirety.

BACKGROUND OF THE INVENTION

1. Field of the Invention

The present invention relates to a humidifier, and more particularly, to an evaporative humidifier for a fuel cell system capable of humidifying gas supplied to a fuel cell system.

2. Description of the Background Art

A fuel cell is being spotlighted as a non-polluting alternative energy system. A Polymer Electrolyte Membrane Fuel Cell (PEMFC) among the fuel cells is operated at a low temperature less than 80° C., and is able to start up in a short time. Furthermore, the PEMFC has a fast response characteristic according to a load variation. Accordingly, the PEMFC is being widely applied to various fields including an automobile, a mobile communication device, a medical equipment, etc.

The PEMFC generates electricity accordingly as oxygen and hydrogen are respectively supplied to a cathode and an anode of a polymer membrane inside a fuel cell stack. That is, hydrogen, fuel gas is supplied to the anode of the fuel cell stack, and oxygen is supplied to the cathode of the fuel cell stack. A polymer membrane for passing only proton is disposed between the anode and the cathode. The proton moves from the anode to the cathode through the polymer membrane, and electron ($e^-$) is separated therefrom, thereby generating electricity. The oxygen supplied to the cathode reacts with the proton having passed through the polymer membrane, thereby generating water and heat.

In order to efficiently operate the fuel cell, the polymer membrane has to contain a certain amount of moisture therein. When an amount of moisture is less, proton conductivity is degraded and the membrane is contracted. On the contrary, when the amount of moisture is excessive, flooding occurs thus to lower an electrochemical reaction rate. In order to control the moisture content of the polymer membrane properly, a humidifier is required for humidifying gas supplied to the fuel cell stack.

A humidifying method of the humidifier includes ultrasonic vibration method using ultrasonic vibration, a bubbling method using a vaporization by external heating, a humidifying method using a membrane, etc. The conventional humidifying methods have the following problems.

First, in the ultrasonic vibration method, water emitted by ultrasonic vibration is not small enough to perform an efficient humidifying operation. Furthermore, since liquid droplets are attached to an inner surface of a humidifier, it is difficult to constantly and precisely perform a humidifying operation.

Second, in the bubbling method, an additional heating system for vaporization has to be provided, and a heating energy has to be supplied. Also, in case of a spraying method, an additional system and energy for compressing water to a high pressure are required.

Third, in the humidifying method using a membrane, moisture of exhaust gas is transferred to supply gas through a membrane that transmits only the vapor but not the gas. Even if additional energy is not required in the method, a surface area of a membrane has to be sufficiently large for an efficient humidifying operation. In this respect, a bundle of fine tubes with a diameter of approximately 1 mm made of the moisture exchange membrane is generally used in a similar way to a shell-and-tube heat exchanger. However, since the membrane is expensive and is not easily processed, this type of humidifier is not suitable for mass production thus to increase the production cost of a humidifier. Moreover, since the humidifier in this method is very complicated in structure, the pressure loss tends to increase enormously especially in the gas stream flowing inside the tubes Recently, a humidifying method requiring no additional energy and utilizing evaporation from a hydrophilic-treated surface has been disclosed in the U.S. Pat. Nos. 6,779,351, and 6,871,844.

However, according to a general humidifying method, a condenser to recover water from the exhaust gas for humidification has to be additionally provided thus to increase an entire size of a humidifying system.

Second, according to the humidifying method disclosed in the U.S. Pat. No. 6,779,351, since extended surface is not implemented, channels have to be arranged with a narrow gap therebetween for efficient heat transfer. Herein, the gas to be humidified is introduced into an evaporation channel through small holes, thereby greatly increasing pressure loss of the gas stream. Furthermore, since water does not efficiently spread on the surface of the evaporation channel, it is difficult to obtain sufficient humidification effect with this method.

Third, according to the humidifying method disclosed in the U.S. Pat. No. 6,871,844, the pressure loss tends to increase in the gas stream in the evaporation channel due to a moisture-absorbing material irregularly packed in the channel. Furthermore, since the moisture tends to condense mostly on a surface of a fin, most of the condensed water flows down along the surface of the fin and only small portion of the water transfers to the evaporation channel through a hole arranged at the channel wall. Accordingly, the condensed water tends to accumulate at a lower side of the condensation channel without being supplied to an evaporation channel. Moreover, when the pressure in the evaporation channel is higher than that in the condensation channel, the condensed water does not transfer from the condensation channel to the evaporation channel but, rather, the gas leaks from the evaporation channel to the condensation channel due to the pressure difference between the channels.

SUMMARY OF THE INVENTION

Therefore, an object of the present invention is to provide an efficient and compact evaporative humidifier for a fuel cell system capable of humidifying the supply gas stream without supplying water externally.

To achieve these and other advantages and in accordance with the purpose of the present invention, as embodied and broadly described herein, there is provided an evaporative humidifier for a polymer electrolyte membrane fuel cell system including a fuel cell stack, comprising: a condensation channel to which exhaust gas from the fuel cell stack is introduced; an evaporation channel to which supply gas for the fuel cell stack is introduced; a partition wall for separating the condensation channel and the evaporation channel from each other; and a water distribution unit for supplying water into the evaporation channel, wherein the water is condensed in the condensation channel by heat exchange between the exhaust gas and the supply gas.

Exhaust gas of high temperature and high humidity exhausted from the fuel cell stack and introduced into the condensation channel is cooled by the supply gas of low temperature and low humidity in the evaporation channel, thereby condensing the moisture in the condensation channel. At the evaporation channel, the supply gas of low temperature and low humidity is heated by the heat transferred form the condensation channel through the partition wall and is also humidified by evaporation of the water previously condensed in the condensation channel and supplied into the evaporation channel via the water distribution unit. Accordingly, the supply gas heated and humidified can be supplied to a fuel cell without an external supply of heating energy nor external supply of evaporation water. Moreover, the humidifier according to the present invention is simple in structure, and thus very suitable for mass production.

In the humidifier according to the present invention, fins are integrally formed both at the condensation channel and the evaporation channel by a brazing method so as to enhance heat transfer and thus to improve the condensation and the evaporation of the water. The fin of the evaporation channel is treated to have a thin hydrophilic porous layer on the surface so as to further improve water evaporation effect. Also, the fin of the condensation channel is treated to have a hydrophilic surface so as to enhance water drainage performance.

The fins and partition walls are respectively made of a metallic material such as aluminum and brazed into a single unit for compactness and for feasibility of mass production.

A water tank for collecting condensed water in the condensation channel is located at a lower side of the condensation channel. The condensed water collected in the water tank is pumped to a water distribution unit to be supplied to the evaporation channel. Herein, a depth of the water tank is determined with consideration of a pressure difference between the evaporation channel and the condensation channel that may occur while the fuel cell is operated.

The water tank may be formed also at a lower side of the evaporation channel by being extended in a width direction. The water having not been evaporated while flowing down the evaporation channel is collected in the water is tank, and then is recycled to the evaporation channel.

A compartment may be formed in the water tank to separate it into two parts: the evaporation channel side and the condensation channel side. The compartment allows the collected water to flow between the two sides, but prevents the gas streams in the two channels from being mixed with each other. In this respect, the compartment may be installed leaving an open spacing at the lower part of the water tank or provided with through holes.

Since gas of a high temperature is introduced into the condensation channel, an inlet of the condensation channel is formed at a lower side of an outlet so as to enhance a heat exchange efficiency between the condensation channel and the evaporation channel. Since gas of a low temperature is introduced into the evaporation channel, an inlet of the evaporation channel is formed at an upper side of an outlet of the evaporation channel.

An extended plate with slant surface is formed at a lower side of the exhaust gas inlet of the condensation channel by being extended from one surface of a casing that constitutes the condensation channel. The extended plate with slant surface serves to prevent the water contained in the water tank from overflowing through the exhaust gas inlet of the condensation channel even if the humidifier is inclined.

At a region where the extended plate with slant surface is not formed, the condensed water condensed in the condensation channel directly drops into the water tank along a wall of the condensation channel. Furthermore, at a region where the extended plate with slant surface is formed, the condensed water condensed in the condensation channel drops onto a slant surface formed at an upper surface of the extended plate thus to be collected into the water tank.

An extended plate with slant surface is formed at a lower side of the supply gas outlet of the evaporation channel by being extended from one surface of the casing that constitutes the evaporation channel. The extended plate with slant surface serves to prevent the water contained in the water tank from overflowing through the supply gas outlet of the evaporation channel even if the humidifier is inclined.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
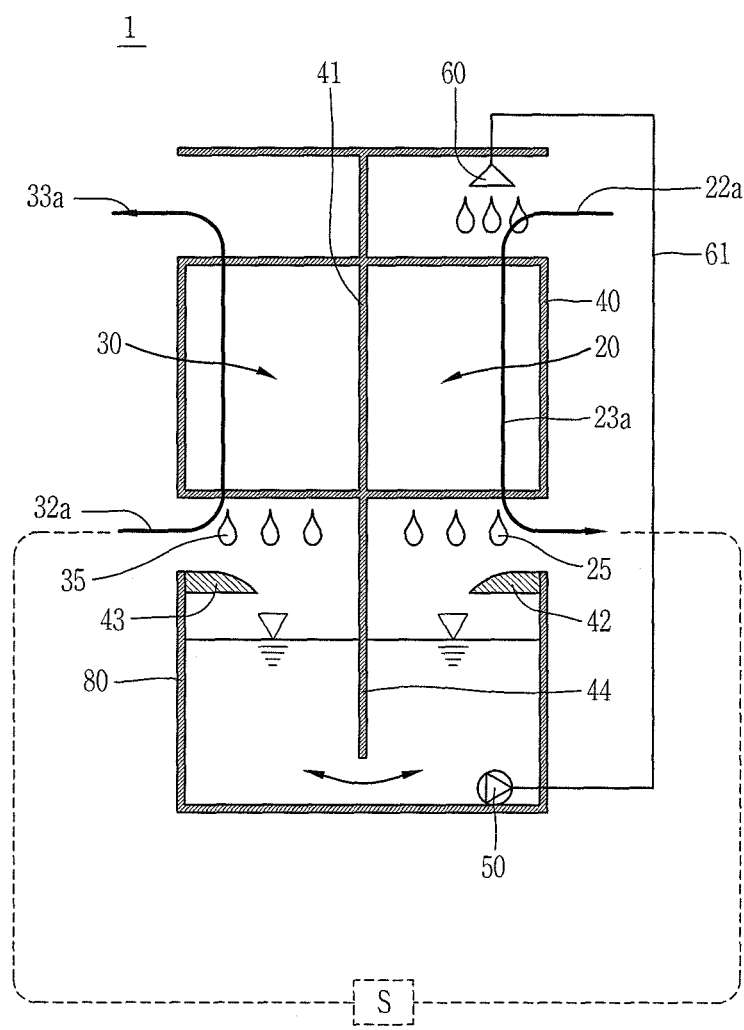
FIG. 1 is a schematic view showing an evaporative humidifier for a fuel cell system according to a first embodiment of the present invention.

As shown in FIG. 1, an evaporative humidifier 1 for a fuel cell system having a fuel cell stack according to a first embodiment of the present invention, comprises an evaporation channel 20, a condensation channel 30, a partition wall 41, a water distribution unit, and a water tank 80.

Figure 2:
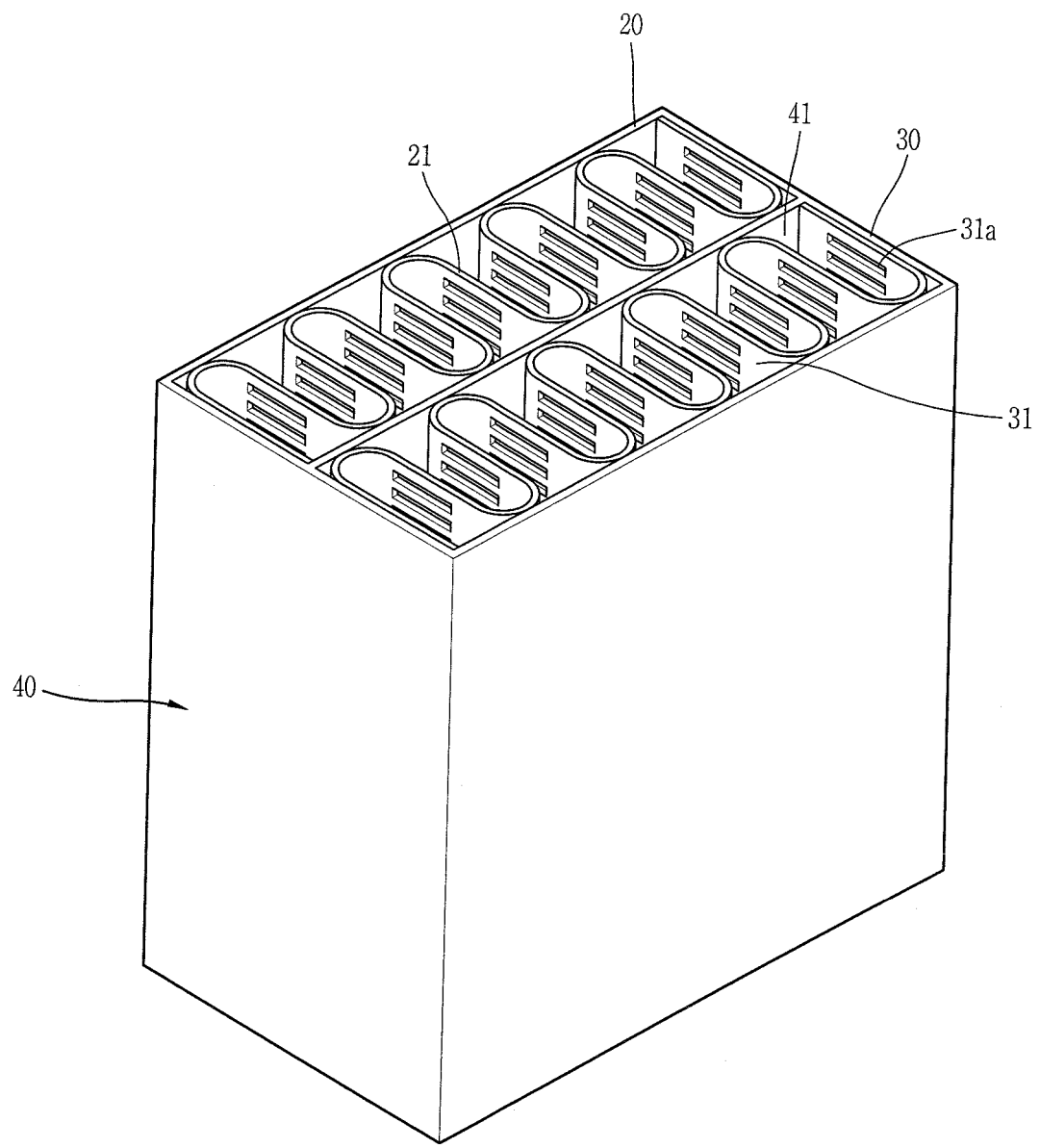
FIG. 2 is a perspective view showing an evaporation channel and a condensation channel of the evaporative humidifier for a fuel cell system of FIG. 1.

Referring to FIG. 2, the evaporation channel 20 and the condensation channel 30 are defined by a hollow casing 40 that forms each outer circumference of the evaporation channel 20 and the condensation channel 30. The partition wall 41 separates the evaporation channel 20 and the condensation channel 30 from each other. The casing 40 and the partition wall 41 are respectively formed of an aluminum material, and are brazed into a single unit thus to facilitate mass production.

The evaporation channel 20 and the condensation channel 30 are provided with a heat transfer fin 21 and a heat transfer fin 31, respectively. The heat transfer fin 21 is treated to have a hydrophilic porous layer of fine pores according to the 'Method for processing a surface of a heat exchanger for enhancing wettability of Korean Open-Laid Patent Publication No. 2004-5108. Accordingly, the surface of the heat transfer fin 21 of the evaporation channel 20 has an enhanced wettability thus to efficiently evaporate water. The heat transfer fin 31 in the condensation channel 30 is treated to have hydrophilic surface to improve the water drainage performance without forming liquid droplets on the surface of the fin.

Figure 3:
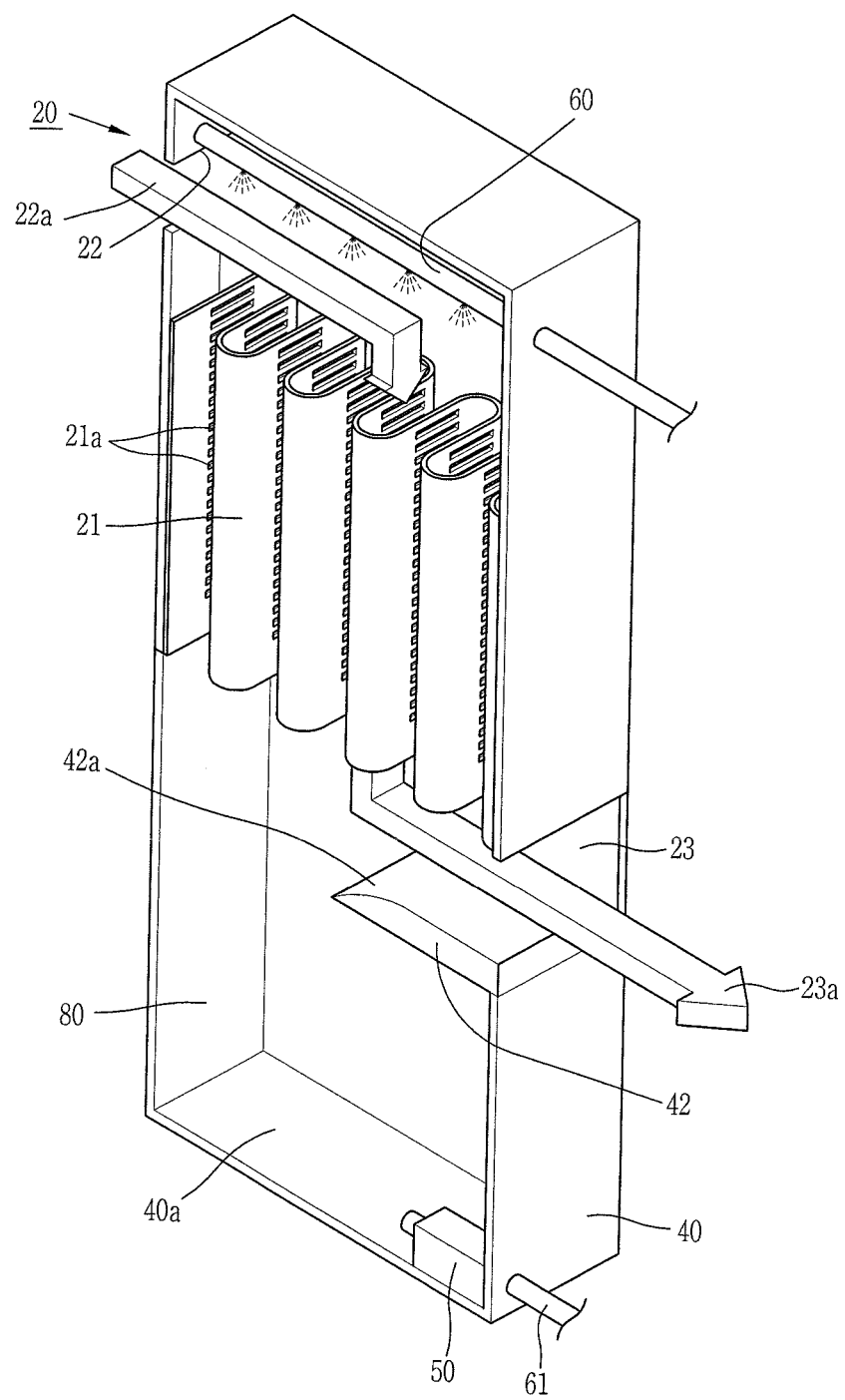
FIG. 3 is a perspective view showing the evaporation channel of the evaporative humidifier for a fuel cell system of FIG. 1.

Referring to FIG. 3, the evaporation channel 20 is defined by the casing 40, and comprises the heat transfer fin 21, a supply gas inlet 22, and a supply gas outlet 23.

The heat transfer fin 21 is brazed to the casing 40 so as to ensure good thermal contact. The heat transfer fin 21 may be provided with a plurality of louvers 21a on a surface thereof. The louvers 21a serve to enhance a heat exchanging function between supply gas of a low temperature and humidity state inside the evaporation channel 20 and exhaust gas of a high temperature and humidity state inside the condensation channel 30 (see FIG. 1). Preferably, the heat transfer fin 21 is also formed of an aluminum material.

The supply gas inlet 22 is formed at an upper portion of the casing 40 that forms the evaporation channel 20, and the supply gas outlet 23 is formed at a lower portion of the casing 40. Supply gas of a low temperature and humidity state is introduced into the evaporation channel 20 through the supply gas inlet 22 in one direction (22a), and supply gas of a high temperature and humidity state is exhausted through the supply gas outlet 23 in another direction (23a).

Figure 4:
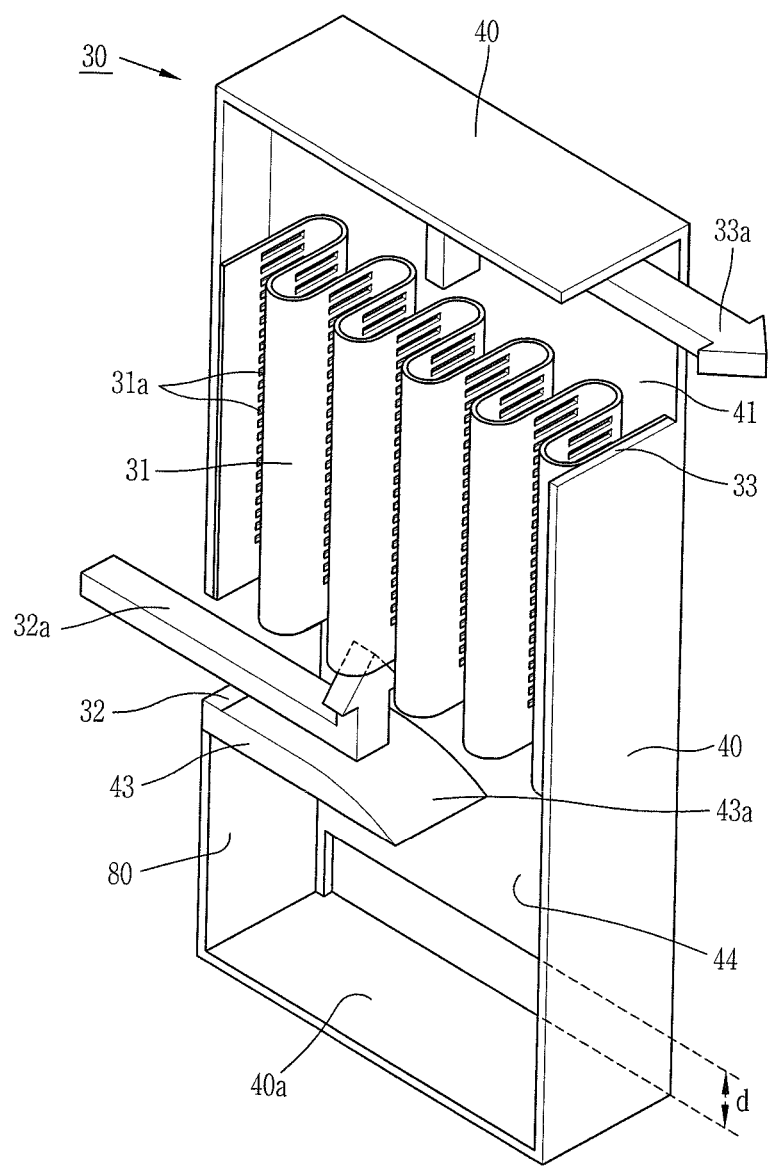
FIG. 4 is a perspective view showing the condensation channel of the evaporative humidifier for a fuel cell system of FIG. 1.

Referring to FIG. 4, the condensation channel 30 comprises the heat transfer fin 31, an exhaust gas inlet 32, and an exhaust gas outlet 33.

The heat transfer fin 31 is also brazed to the casing 40. The heat transfer fin 31 is provided with a plurality of louvers 31a on a surface thereof. The louvers 31a serve to enhance a heat exchanging function between supply gas of a low temperature and humidity state inside the evaporation channel 20 (see FIG. 1) and exhaust gas of a high temperature and humidity state inside the condensation channel 30. Preferably, the heat transfer fin 31 is also formed of an aluminum material.

The exhaust gas inlet 32 is formed at a lower portion of the casing 40 that forms the condensation channel 30, and the exhaust gas outlet 33 is formed at an upper portion of the casing 40. Exhaust gas of a high temperature and humidity state is introduced into the condensation channel 30 through the exhaust gas inlet 32 in one direction 32a, and exhaust gas of a low temperature and humidity state is exhausted through the exhaust gas outlet 33 in another direction 33a.

Referring to FIGS. 3 to 6, the water tank 80 is arranged at a lower side of the evaporation channel 20 and the condensation channel 30. The water tank 80 collects the water 25 having not been evaporated from the water supplied to the evaporation channel 20 through a distributor 60, and also collects the condensed water 35 in the condensation channel 30.

Figure 5:
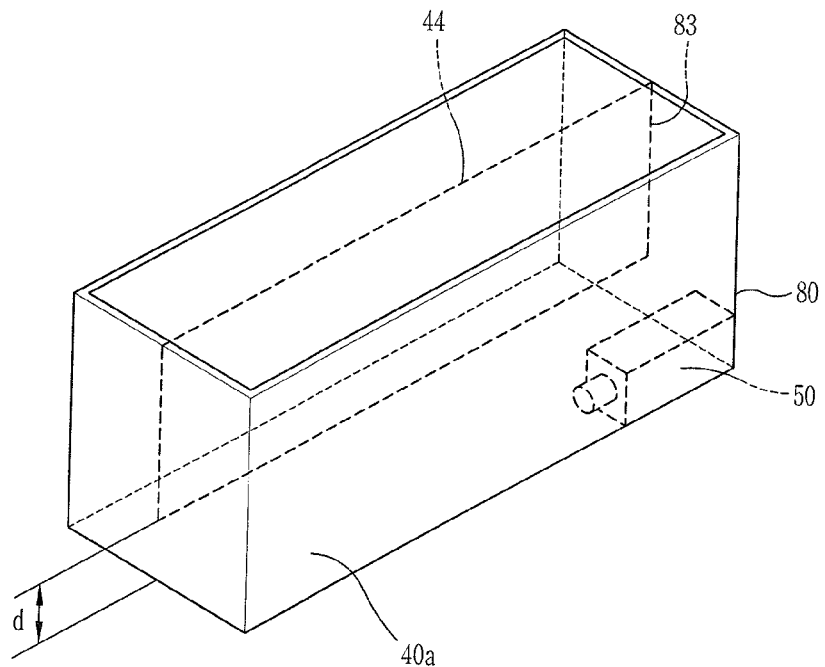
FIG. 5 is a perspective view showing a water tank of the evaporative humidifier for a fuel cell system of FIG. 1.

As shown in FIG. 5, a compartment 44 is located as an extension of the partition wall 41 towards a bottom surface 40a of the casing 40 that forms the water tank 80, leaving a spacing with a gap distance (d). Accordingly, the compartment 44 enables the water in the water tank 80 to flow between the two sides of the humidifier preventing the two gas streams in the evaporation channel 20 and the condensation channel 30 from mixing.

Figure 6:
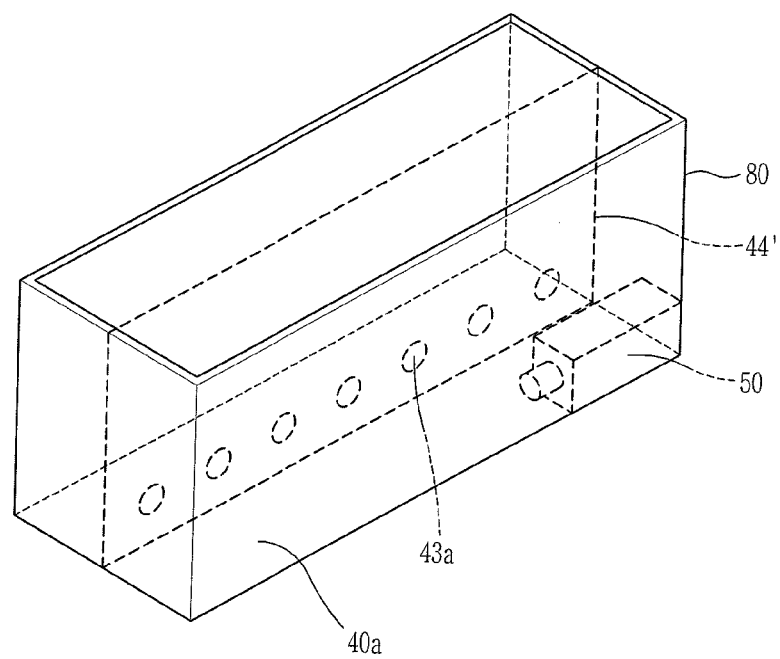
FIG. 6 is a perspective view showing the water tank of FIG. 1 according to a second embodiment of the present invention.

As shown in FIG. 6, as another example, the partition wall 41 is extending to contact the bottom surface 40a of the casing 40 that forms the water tank 80, thereby forming a compartment 44'. At least one through hole 43a is formed at the compartment 44'. Through the through hole 43a, the water 25 collected in the water tank 80 at a lower side of the evaporation channel 20 and the condensed water 35 collected in the water tank 80 at a lower side of the condensation channel 30 are mixed with each other thus to be pumped by a pump 50. Also, the compartment 44' enables the partition wall 41 to be supported by the bottom surface 40a of the casing 40, thereby providing a structural stability.

Referring to FIGS. 1, 3 and 4, an extended plate 42 is protruding from an inner wall of the casing 40 at a just lower side of the supply gas outlet 23 of the casing 40 that defines the evaporation channel 20, thereby preventing the water (the water 25 and the condensed water 35) inside the water tank 80 from being overflowed. Furthermore, in order to prevent the water inside the water tank 80 from being overflowed when the humidifier 1 is inclined, an extended plate 43 is protruding from the inner wall of the casing 40 at a just lower side of the exhaust gas inlet 32.

The extended plates 42 and 43 are provided with slant surfaces 42a and 43a respectively at upper surfaces thereof, thereby flowing the water dropped on the surfaces into the water tank 80.

Figure 7:
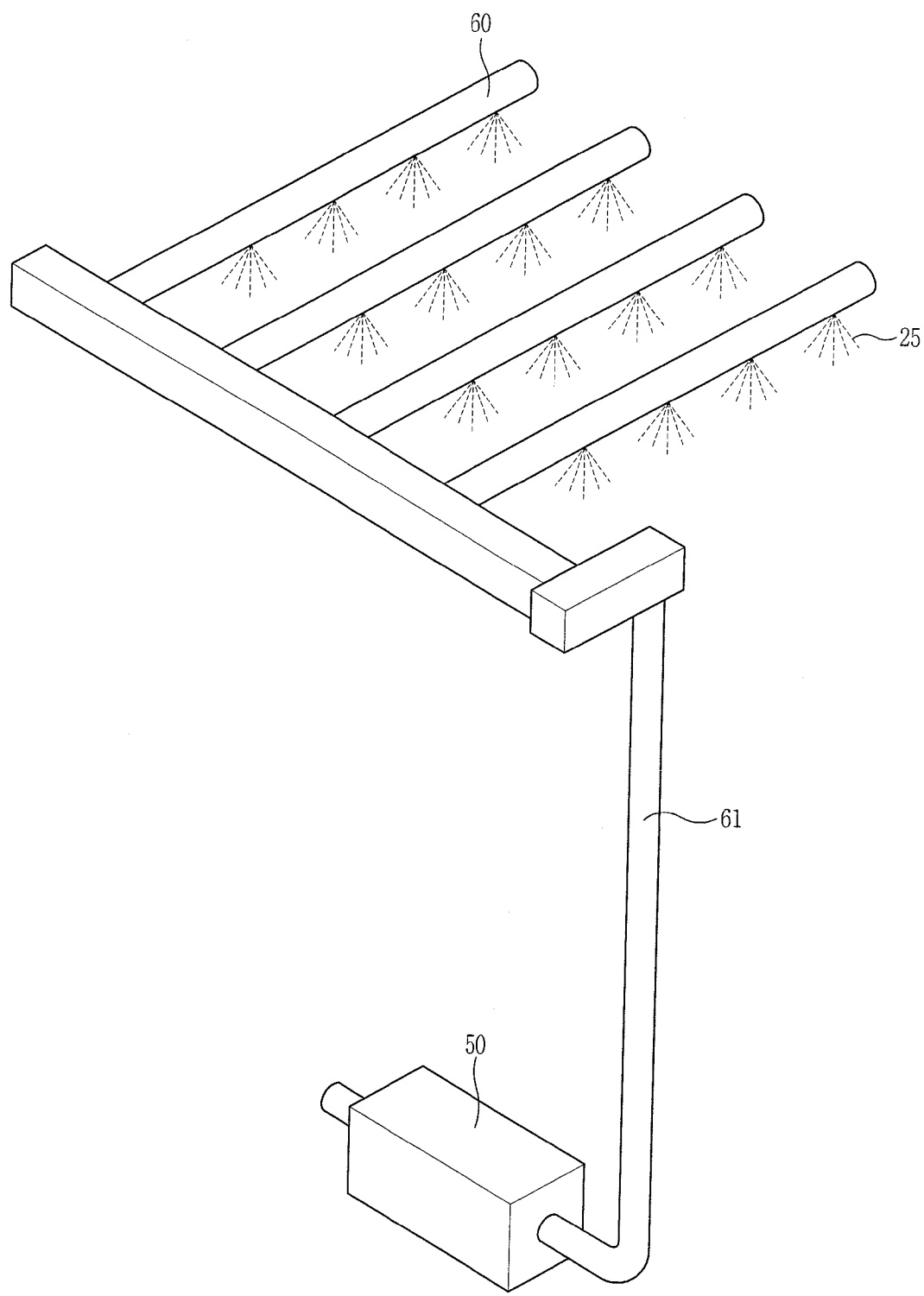
FIG. 7 is a perspective view showing a distributor of the evaporative humidifier for a fuel cell system of FIG. 1.

Referring to FIGS. 1 and 7, the water distribution unit for supplying water from the water tank 80 to the evaporation channel 20, comprises a pump 50, a distributor 60, and a pipe 61. The pump 50 is arranged at the water tank 80.

The distributor 60 is arranged on top of the evaporation channel 20, thereby dripping water to the evaporation channel and humidifying the supply gas. Herein, the pipe 61 connects the pump 50 and the distributor 60 to each other.

Hereinafter, the operation of the evaporative humidifier for a fuel cell system according to the first embodiment of the present invention will be explained.

Figure 8:
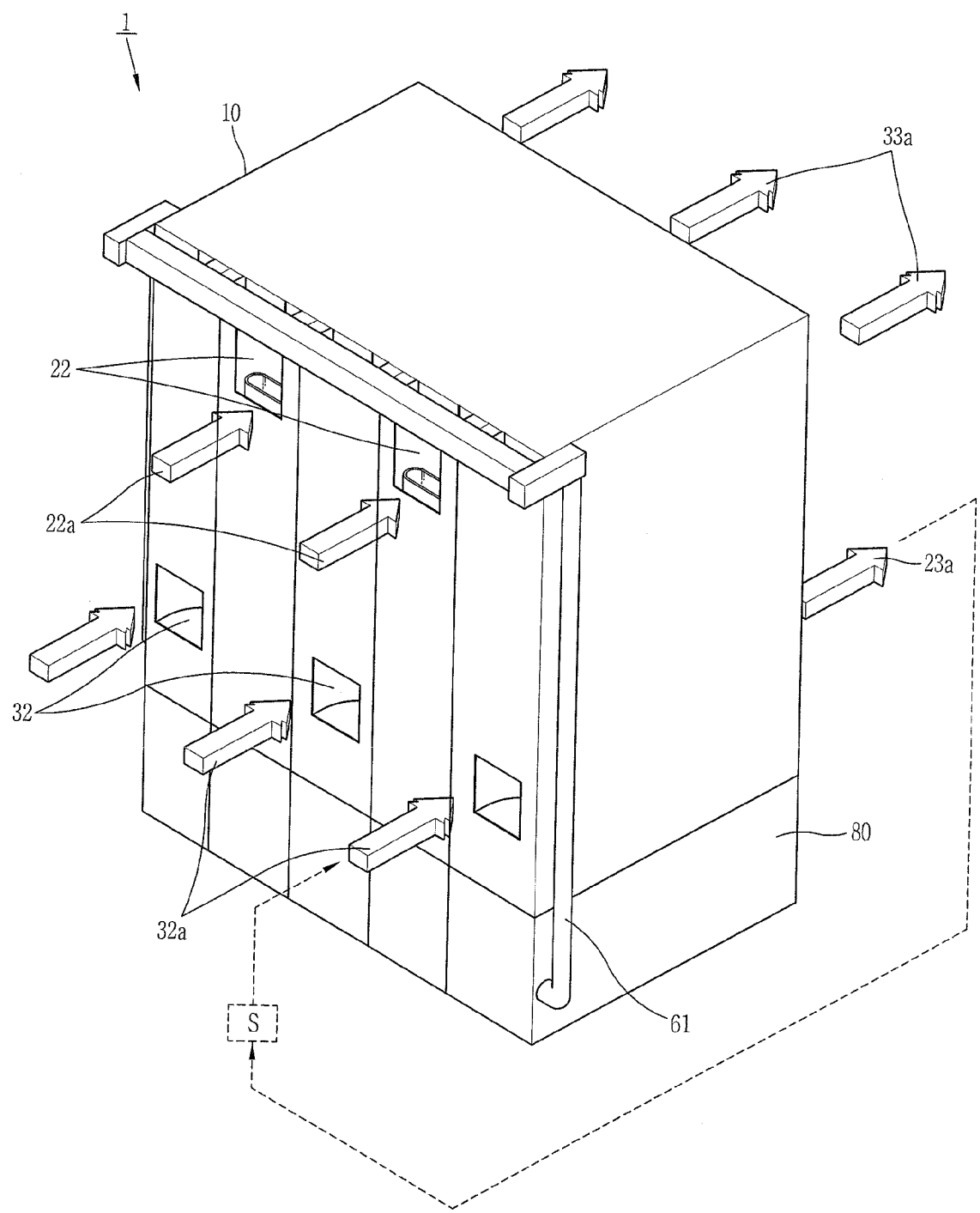
FIG. 8 is a perspective view showing an appearance of the evaporative humidifier for a fuel cell system of FIG. 1.

Referring to FIGS. 1 and 8, supply gas of a low temperature and humidity state is introduced into the evaporation channel 20 through the supply gas inlet 22 in one direction 22a, and then is heated by heat transfer from the air of a high temperature in the condensation channel 30. Then, the supply gas becomes a high humid state by evaporating the water supplied by the distributor 60. The supply gas of a high temperature and humidity state is exhausted from the supply gas outlet 23 of the evaporation channel 20 in another direction 23a, and thus is supplied to a fuel cell stack S.

Exhaust gas of a high temperature and humidity state exhausted from the fuel cell stack S is introduced into the condensation channel 30 through the exhaust gas inlet 32 in one direction 32a parallel with the supply gas inlet direction 22a. Then, the exhaust gas of a high temperature and humidity state transfers heat to the supply gas of a low temperature and humidity state introduced into the evaporation channel 20 through the partition wall 41, thereby condensing the moisture contained in the gas. Since the water condensation occurs in the condensation channel of the humidifier, an external condenser for condensing water (e.g., condensed water 35) is not required. Accordingly, an entire structure for the humidifier 1 for a fuel cell system is simplified, and an additional driving force to drive a condenser is not required thus to save a driving cost for the humidifier 1.

Then, the exhaust gas of a high temperature and humidity state is exhausted from the condensation channel 30 through the exhaust gas outlet 33 in another direction 33a.

At a region where the extended plate 43 is not formed, the condensed water 35 condensed in the condensation channel 30 directly drops into the water tank 80 along the wall of the casing 40 that defines the condensation channel 30. Furthermore, at a region where the extended plate 43 is formed, the condensed water 35 condensed in the condensation channel 30 drops onto the slant surface 43a formed at an upper surface of the extended plate 43 thus to be collected in the water tank 80. The water 25 having been supplied to the evaporation channel 20 through the distributor 60 also flows down along the extended plate 42 or the slant surface 42a, thereby being collected in the water tank 80. As shown in FIG. 7, the water collected in the water tank 80 is pumped by the pump 50 thus to flow through the pipe 61, thereby being distributed to the evaporation channel 20. Accordingly, the supply gas introduced into the evaporation channel 20 is heated and humidified to be continuously supplied to a polymer membrane of the fuel cell system S without an external supply of the evaporation water.

Figure 9:
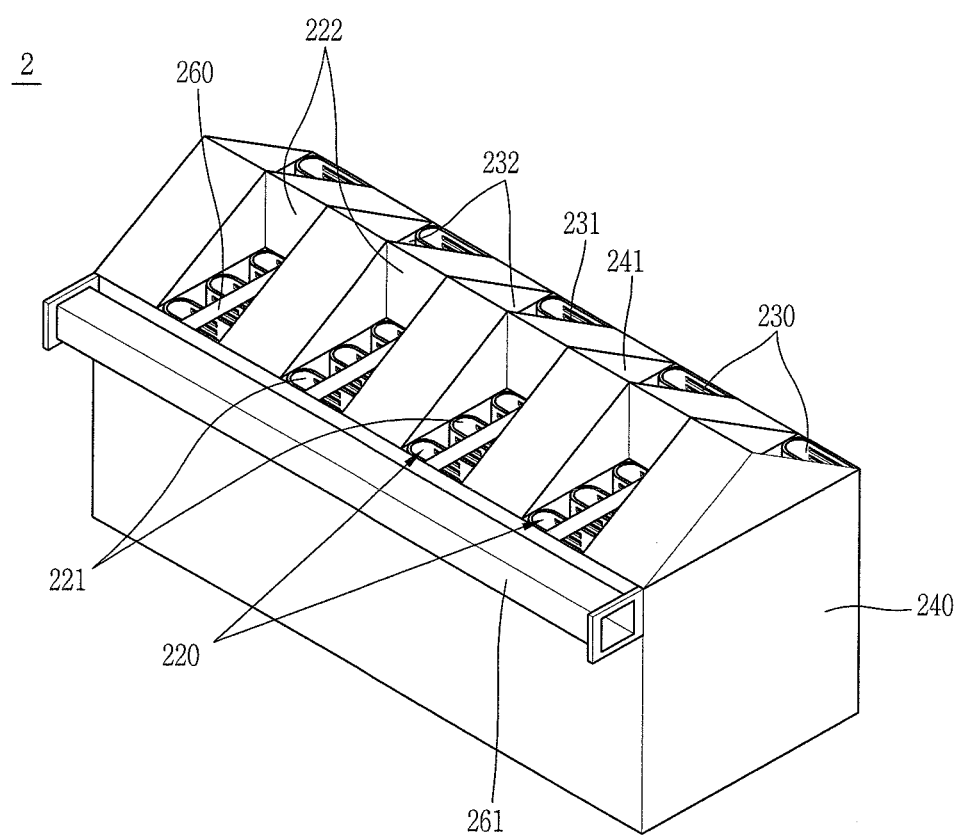
FIG. 9 is a perspective view showing an appearance of the evaporative humidifier for a fuel cell system of FIG. 1 according to a second embodiment of the present invention.

An evaporative humidifier 2 for a fuel cell system according to a second embodiment of the present invention will be explained with reference to FIG. 9. Referring to FIG. 9, differently from the first embodiment, the evaporation channel 220 and the condensation channel 230 are constructed so that a gas introduction direction and a gas exhaust direction can be perpendicular to each other not only be parallel with each other.

Supply gas of a low temperature and humidity state is introduced into an evaporation channel 220 through an inlet 222 formed at an upper side of the humidifier 2, and exhaust gas of a high temperature and humidity state is introduced into a condensation channel 230 through an inlet 232 formed at an lower side of the humidifier 2. The supply gas and the exhaust gas perform a heat exchange function under a state that a partition wall 241 is disposed therebetween. Likewise in the first embodiment, the evaporation channel 220 and the condensation channel 230 are provided with heat transfer fins 221 and 231. Also, an outlet (not shown) through which gas is exhausted is respectively formed at the evaporation channel 220 and the condensation channel 230.

Figure 10:
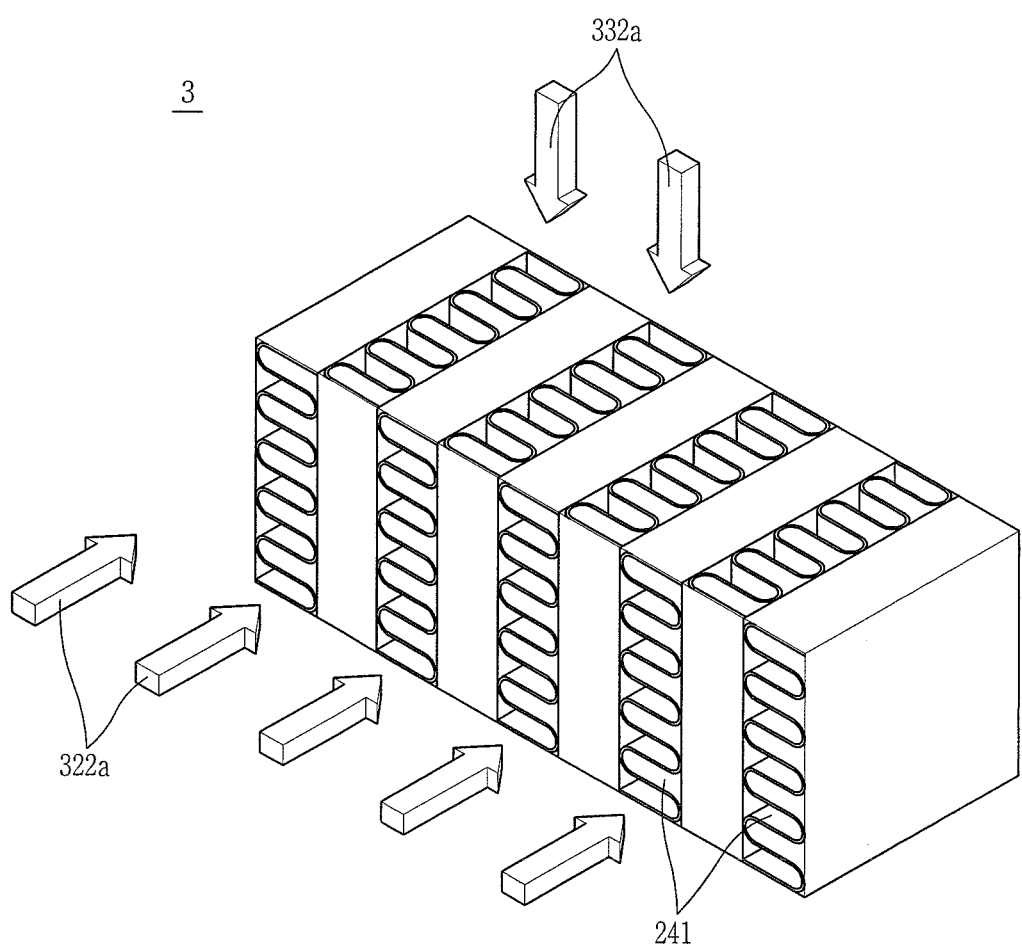
FIG. 10 is a perspective view showing an appearance of the evaporative humidifier for a fuel cell system of FIG. 1 according to a third embodiment of the present invention.

FIG. 10 shows the arrangement of the evaporation channel and the condensation channel according to the third embodiment of the present invention. In this embodiment, the two channels are arranged in a cross-flow arrangement differently form the first and second embodiments of the counter-current flow arrangement. Therefore, a flow direction of supply gas 322a is perpendicular to that of exhaust gas 332a.

The operation of the evaporative humidifiers 2 and 3 according to the second and the third embodiments of the present invention is the same as that according to the first embodiment. The same reference numerals as those of the first embodiment were given to the same parts of the second embodiment, and detailed explanation thereof will be omitted.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

Differently from the aforementioned embodiments, the exhaust gas inlet 32 may be formed at an upper side of the exhaust gas outlet 33, and the supply gas inlet 22 may be formed at a lower side of the supply gas outlet 23. The exhaust gas inlet 32 and the exhaust gas outlet 33 may be formed at the same height, or the supply gas inlet 22 and the supply gas outlet 23 may be formed at the same height. The evaporation channel and the condensation channel have only to be constructed to have a partition wall by which a heat exchange function is performed. Accordingly, how to flow supply gas and exhaust gas in the evaporation channel and the condensation channel can be variously modified by those skilled in the art.

What is claimed is:

1. An evaporative humidifier for a polymer electrolyte membrane fuel cell system including a fuel cell stack, comprising:
a condensation channel to which exhaust gas from the fuel cell stack is introduced;
an evaporation channel to which supply gas for the fuel cell stack is introduced;
a heat conductive partition wall with two sides, for separating the condensation channel and the evaporation channel from each other;
a water tank arranged below the condensation channel and the evaporation channel and configured to collect condensed water dropped from the condensation channel and the evaporation channel;
a water distribution unit configured to receive the condensed water from the water tank and to supply the received water into the evaporation channel, wherein the condensed water is condensed in the condensation channel by heat exchange between the exhaust gas and the supply gas via the partition wall,
wherein the evaporation channel, the water tank and the water distribution unit are configured to circulate the condensed water, and
wherein at least a portion of the heat conductive partition wall is extended towards a bottom surface of the water tank, so as to be positioned in the condensed water contained in the water tank, such that the exhaust gas and the supply gas do not pass therethrough, but wherein the condensed water in the water tank flows between both sides of the heat conductive partition wall.

2. The evaporative humidifier for a fuel cell system of claim 1, further comprising a heat transfer fin arranged at the condensation channel and the evaporation channel.

3. The evaporative humidifier for a fuel cell system of claim 1, wherein the inner surface of the evaporation channel includes a hydrophilic porous layer of fine pores on the surface.

4. The evaporative humidifier for a fuel cell system of claim 1, wherein the condensation channel and the evaporation channel are covered by a casing, and the casing and the partition wall are respectively formed of a metallic material.

5. The evaporative humidifier for a fuel cell system of claim 1, wherein the water tank is provided with a compartment.

6. The evaporative humidifier for a fuel cell system of claim 1, wherein the condensation channel comprises an inlet through which the exhaust gas is introduced and an outlet through which the exhaust gas is discharged, wherein the inlet is formed at a lower side of the outlet.

7. The evaporative humidifier for a fuel cell system of claim 6, wherein an extended plate with a slant surface extending from a lower side of the inlet of the condensation channel in a width direction is further provided.

8. The evaporative humidifier for a fuel cell system of claim 1, wherein the evaporation channel comprises an inlet through which the supply gas is introduced and an outlet through which the supply gas is discharged, wherein the inlet is formed at an upper side of the outlet.

9. The evaporative humidifier for a fuel cell system of claim 8, wherein an extended plate with a slant surface extending from a lower side of the outlet of the evaporation channel in a width direction is further provided.

* * * * *